March 9, 1937. A. A. KNEE 2,073,392
ADJUSTABLE CHECK TESTING APPARATUS
Filed July 20, 1935 6 Sheets-Sheet 1

Inventor:
AARON A. KNEE
By Paul Eaton Attorney

March 9, 1937.　　　　A. A. KNEE　　　　2,073,392
ADJUSTABLE CHECK TESTING APPARATUS
Filed July 20, 1935　　　6 Sheets-Sheet 5

Aaron A. Knee
Inventor

Patented Mar. 9, 1937

2,073,392

UNITED STATES PATENT OFFICE 2,073,392

ADJUSTABLE CHECK TESTING APPARATUS

Aaron A. Knee, Charlotte, N. C., assignor to Vanak Corporation, Charlotte, N. C., a corporation of North Carolina Application July 20, 1935, Serial No. 32,420

15 Claims. (Cl. 194—97)

This invention relates to check testing apparatus designed primarily for use in connection with check controlled apparatus such as vending machines, pay stations, and in fact any apparatus in which a check or coin is inserted for the purchase of goods or service.

It is an object of this invention to provide a check testing apparatus having means for testing a check as to the relative differences of its surface configurations, and also testing it as to its diameter and also testing it as to its thickness, together with selectively settable means for rendering the diameter testing means inoperable when an oversized check is inserted so that the oversized check will be received and approved if its surface configurations and thickness passes the respective tests therefor.

It is another object of this invention to provide in a check testing apparatus a plurality of feelers for testing a check as to its surface configuration and having a check provided with a number of depressions in its surface which is not equal to the number of the feelers, together with means controlled by the feelers for disposing of the check after it has been subjected to a testing operation.

It is another object of this invention to provide in a check testing apparatus means whereby a plurality of checks can be inserted into the machine at a given time and whereby all of the checks except the lowermost one will be prevented from movement while the lowermost check is allowed to move into the apparatus and be subjected to a testing operation.

It is a further object of this invention to provide a check testing apparatus having a plurality of feelers adapted to engage the surface of an inserted check and to be moved in varying degrees by pressure exerted on the check and having means cooperating with said feelers which will always engage some of the feelers when a genuine check is subjected to the test and whereby the check will be accepted and passed into the machine with which the testing apparatus is associated for operation of the same.

It is a further object of the invention to provide in combination a check testing apparatus having a plurality of feelers and also providing a check having a number of depressions therein differing in number from the number of feelers, so that at least one of the feelers will always engage a depression to cause the apparatus to accept the check as genuine.

It is a further object of this invention to provide in a check testing apparatus means for testing a check as to diameter, thickness and surface configuration, and also having means selectively settable, whereby, the check, if oversized, may be accepted as a genuine check provided its thickness and surface configuration passes the respective tests applied thereto.

Some of the objects of the invention having been stated, other objects will appear as the description proceeds when taken in connection with the accompanying drawings, in which:—

Referring more specifically to the drawings the numeral 10 denotes a suitable base or demonstration stand which has upwardly projecting members 11 and 12, between which, is mounted a framework 13. A suitable bolt 14 is adapted to hold the lower portion of upright members 11 and 12 in spaced relation to each other and a similar bolt 15 holds the upper portion of these members in spaced relation, and at the same time these bolts confine the framework 13 in fixed position. Studs 17 and 18 are fixedly secured in the lower portion of framework 13 which project outwardly beyond the outer surface thereof and penetrate the upright members 11 and 12 to secure the framework in a fixed position. Bolt 19 penetrates the upper end of framework 13 and has its ends projecting beyond the side portions thereof, which ends penetrate the upper end of upright members 11 and 12. These studs 17 and 18 and the bolt 19 cooperate with bolts 14 and 15 to secure framework 13 in a fixed position within the frame 10. The framework 13 has suitable slots 20 and 21 cut in the side thereof through which a coin is adapted to pass when it is inserted into the apparatus. When the coin is inserted in one of these slots, it passes into a chamber 23 which is formed by placing a plate 24 directly in front of the framework 13. Plate 24 has a leaf spring 25 projecting from the upper central portion thereof which projects downwardly and has its lower end contacting a plate 26. This plate 26 is pivoted at its lower end on studs 17 and 18. It can be seen by referring to Figures 1, 2, 3 and 8, that the leaf spring 25 normally forces the upper portion of this plate outwardly from member 13 to the position shown. A suitable set screw 27 with a pointed end is threadably secured in the central portion of plate 26 and has a wire 28 encircling the head thereof which wire projects outwardly through a hole 29 in plate 26. The purpose of this wire is to hold the screw in whatever position to which it might be turned.

Figure 5:
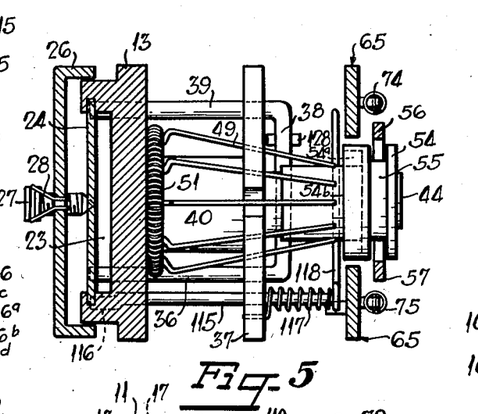
Figure 5 is a sectional plan view taken along the line 5—5 in Figure 3.
Figure 9:
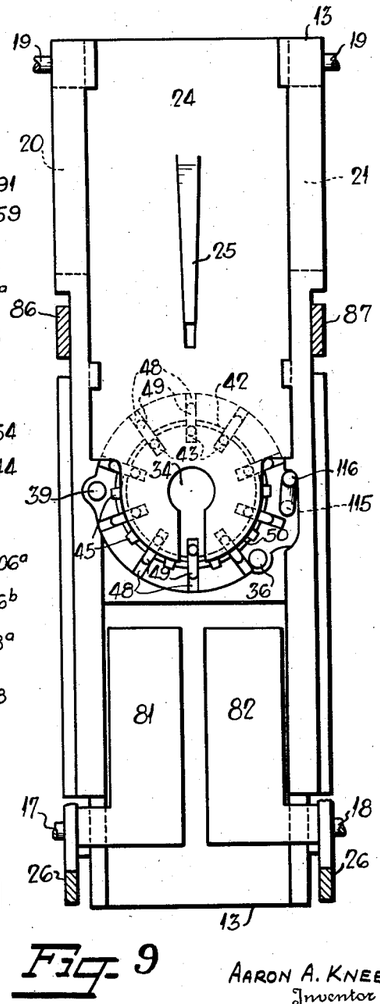
Figure 9 is a vertical sectional view taken along the line 9—9 in Figure 1.

By referring to Figure 9, it will be seen that the lower end of plate 24 has a perforation or notch 34 in the lower end thereof through which the pointed end of set screw 27 projects. When a coin 35 is inserted into the apparatus through either of the slots 20 or 21, it falls to the position shown in Figures 12 and 13, and its downward movement is limited by means of a rod 36, which rod is slidably mounted in framework 13. (Fig. 5.)

Figure 7:
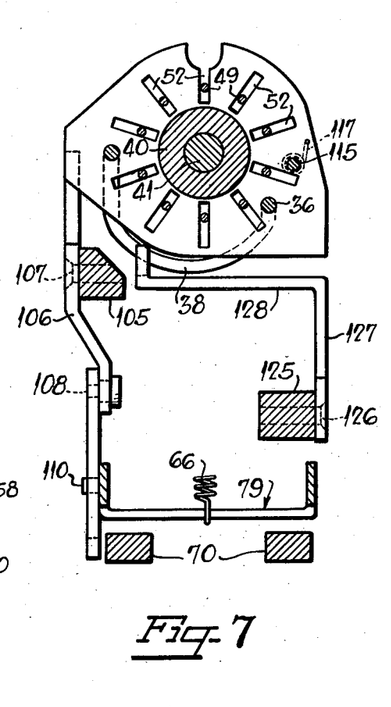
Figure 7 is a vertical sectional view taken along the line 7—7 in Figure 3.

While the coin 35 is in this position it is measured for the correct diameter and the correct thickness by means which will presently be described. The rod 36 is also slidably mounted in plate 37 and its rear portion is bent to form (Figs. 5 and 7) a U-shaped portion 38. Another portion 39 of rod 36 extends forwardly and is slidably mounted in plate 37 and in the framework 13. The portion 39 projects through the front portion of the framework 13 and is adapted to engage the peripheral surface of the coin 35 to hold it in the proper position while it is being measured for diameter.

The framework 13 has a tubular portion 40 projecting backwardly from the central portion thereof in which is mounted a member 41, said member 41 having an enlarged head portion 42 with a plurality of slots 43 cut therein. A suitable stud bolt 44 is threadably secured in the right-hand end of member 41 (Figs. 8 and 9) which normally holds the enlarged portion 42 against the star-like spring washer 45. By adjusting this bolt 44 the opening between the head portion 42 and plate 24 can be increased or decreased since the spring washer 45 normally presses the head portion 42 to the left in Figure 8.

Figure 8:
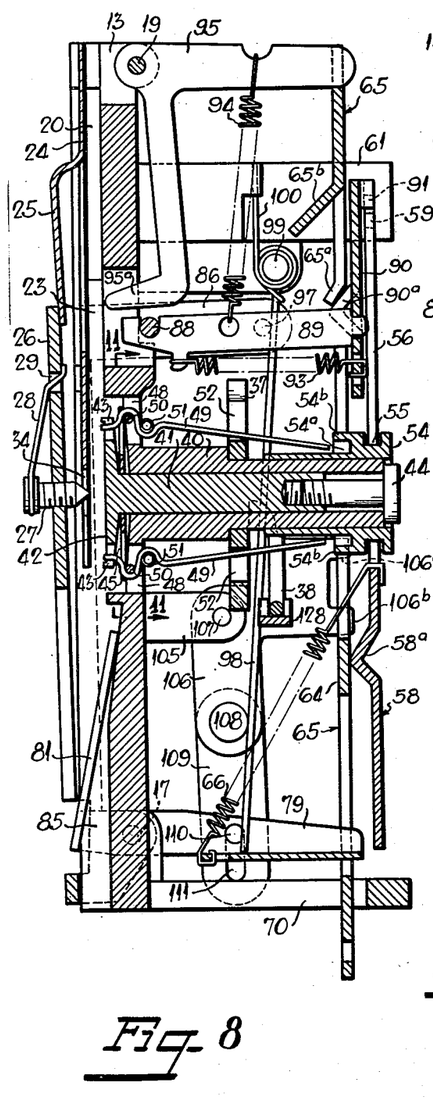
Figure 8 is a vertical sectional view taken along the line 8—8 in Figure 2.
Figure 11:
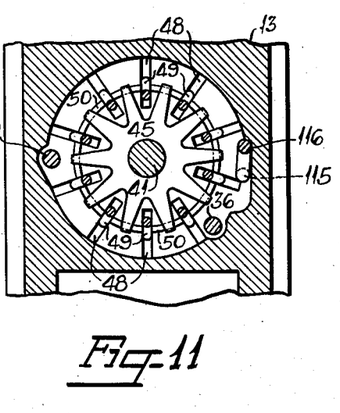
Figure 11 is a sectional detail view taken along the line 11—11 in Figure 8.

It will be noted in Figures 8 and 11 that the framework 13 has a plurality of radially disposed slots 48 therein through which the forward ends of feelers 49 are adapted to project. A coil spring 51 encircles all of the feelers 49 and normally presses them against a ring 50 which ring is embedded in the surface of member 13. The ring 50, therefore, acts as fulcrum point about which feelers 49 pivot. These feelers 49 project to the right in Figure 8 or backwardly in the apparatus and penetrate slots 52 in plate 37 and the right-hand end of these members 49 are adapted to remain in the position shown in Figure 8 when no pressure is applied to the left-hand end of these members.

A collar 54 is slidably mounted on the right-hand portion of member 40 and this collar has a peripheral groove 55 therein into which the legs 56 and 57 are adapted to fit. The legs 56 and 57 form a portion of the forked member 58, which is pivotally mounted as at 59 and 60 in projections 61 and 62, said projections 61 and 62 extending from the framework 13. Member 58 is bent inwardly near its lower portion so as to form a V-shaped portion 58a which is adapted to contact the portion 64 of vertically movable slide 65 when the apparatus is in a position of rest as shown in Figure 8. A tension spring 66 normally holds the V-shaped portion 58a against portion 64 in this position.

It will be noted that the collar 54 has an annular groove 54a in the left-hand portion thereof, (Fig. 8), into which the rear ends of members 49 are allowed to project when none of the configurations on the coin 35 affect the left-hand end of feelers 49. These ends will also project within this annular groove 54a when the vertically sliding bar 65 is pulled downwardly when there is no coin disposed opposite the left-hand portion of feelers 49.

When no coin 35 is present in the apparatus and the bar 65 is pulled downwardly a sufficient amount, to allow the V-shaped portion 58a to move off of the portion 64 the spring 66 will pull the pivoted member 58 along with the collar inwardly, or to the left in Figure 8, to cause the right-hand end of feelers 49 to enter annular groove 54a. The vertical sliding bar 65 is slidably mounted in projections 61, 62 and 70 which extends from the framework 13.

Suitable tension springs 74 and 75 are secured to a lower portion of sliding plate 65 and these springs are secured to the upper portion of legs 56 and 57 respectively, to normally pull the member 65 upwardly at all times. The lower end of plate 65 has a suitable hole therein which is penetrated by a hook 76 which is integral with a lever 77, said lever 77 being pivoted as at 78 to the demonstration stand 10. In actual practice, the lever and demonstration stand will be eliminated, as it will be supported by the machine with which it operates, but it is deemed necessary to show some simple means of mounting for illustrative purposes only.

Figure 2:
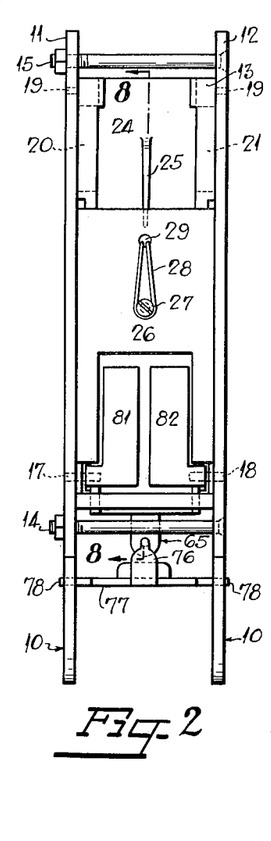
Figure 2 is a front elevation looking at the right-hand side of Figure 1.

The lower end of lever 58 is disposed slightly above the pivoted deflector plate 79, said plate being pivoted on studs 17 and 18 and having upwardly projecting portions 81 and 82 integral therewith, (Figs. 2 and 9). When the plate 65 is pulled downwardly by any suitable means such as a lever 77 while there is no coin disposed near the left-hand portion of feeler 49 it is evident that the portion 64 will move far enough downwardly to allow the V-shaped portion 58a to move inwardly so that the far end of lever 58 will move inwardly above the portion 80 (Fig. 6) of the deflector plate 79 and prevent upward movement of the deflector plate 79 under the tension of spring 66. This inward movement of the lower portion of lever 58 is allowed due to the fact that none of the feelers are actuated and therefore, the right-hand end of feelers 49 will move into the annular groove 54a. If a genuine coin should be disposed opposite the feelers 49 with the required unevenness of configuration thereon, one or more of the feelers would be actuated when lever 65 is pulled downwardly to cause the right-hand end of these feelers to move opposite the rim portion 54b of collar 54. In other words, one or more of the feelers would assume the position shown in Figure 12. In this position the collar 54 and the member 58 would be prevented from moving to the left in Figure 8 and therefore, the deflector of plate 79 would be allowed to be moved upwardly under the tension of spring 66, providing the other dimensions of the coin 35 which are measured by the apparatus are within the limitations prescribed.

If a check with a deep groove therein were tested, it is evident that some of the feelers would not be moved, while others would move outwardly to a point where the rim 54b would not engage their rear ends and the check would be rejected.

Figure 12:
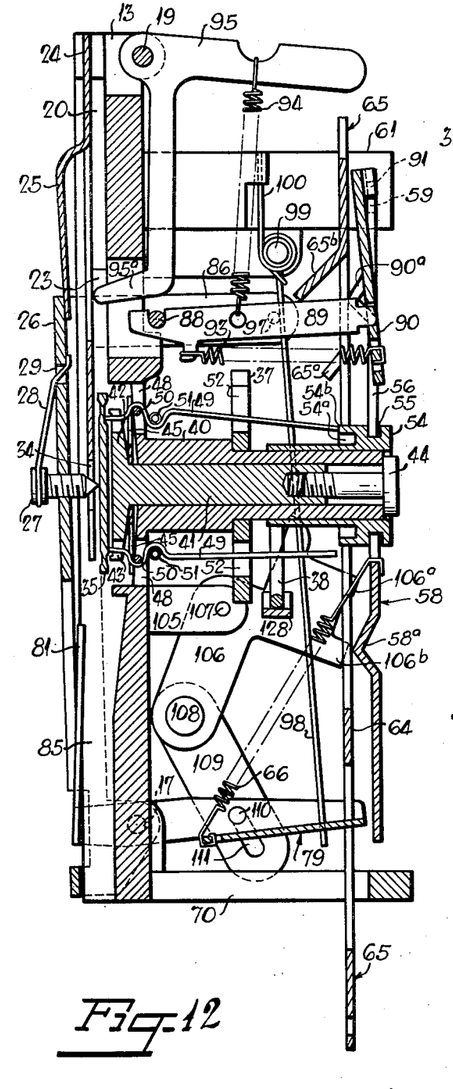
Figure 12 is a vertical sectional view similar to Figure 8 showing the means for gauging the thickness of a coin in operation with other parts in a different position.

It is evident that when deflector plate 79 is allowed to move upwardly under the tension of spring 66 that the upwardly projecting portions 81 and 82 move forwardly to the position shown in Figure 12, thereby allowing the coin 35 to fall on the right-hand side of these upwardly projecting portions down through passageway 85. Should the plate 79 be blocked by the lower portion of member 58, then the members 81 and 82 would remain in the position shown in Figure 8, and the coin would be caused to pass on the left-hand side of projections 81 and 82 and thereby be cast out or rejected by the apparatus.

When a coin or slug which has no surface configurations thereon is placed opposite the left-hand portion of feelers 49 and the coin is pressed against the ends of these feelers by means of the screw 27 in plate 26 all of the feelers 47 will be actuated a like amount, therefore, the right-hand end of all of the feelers would be caused to slide outwardly beyond the rim portion 54b. When this is done the collar 54 and member 58 would be allowed to move inwardly and block the upward movement of the plate 79 to cause the coin to fall to the left of upwardly projecting portions 81 and 82 and thereby reject the coin. These feelers measure the relative differences in the surface configurations of a coin which, in all cases, when the coin is genuine, will vary within a given limit. When the front ends of feelers 49 engage the surface of a coin some of the feelers will be actuated enough to be in the path of rim 54b, and others will be actuated enough to cause the rear ends to miss the rim portion 54b, but in all cases when the coin is genuine, at least one of the feelers 49 will be actuated just enough to cause it to be disposed opposite the rim portion 54b which will prevent movement of collar 54, thereby allowing the deflector plate 79 to move upwardly to cause the coin to fall downwardly behind members 81 and 82 through passageway 85 into the machine.

The above described mechanism merely tests the genuineness of the coin as to the surface configurations. Other means are provided whereby the thickness of the coin may be tested and this means comprises a plate 26, screw 27 and its associated parts. The lower end of plate 26 is pivoted on members 17 and 18 and has rearwardly projecting portions 86 and 87 which are penetrated by a transverse bolt 88. The central portion of bolt 88 is normally engaged by a notch in the left-hand end of bar 89, said bar 89 having its right-hand end fitting into a suitable slot in pivoted baffle plate 90, said plate 90 being pivoted at its upper end as at 91 and 92 in members 61 and 62, (Figs. 8, 10, 11 and 12).

A tension spring 93 has one end thereof connected to bar 89 and its other end connected to plate 90 which normally pulls the right-hand end of bar 89 into engagement with the lower end of plate 90. Another tension spring 94 has its lower end connected to the central portion to bar 89 and its upper end connected to bell crank 95 and this spring normally holds the bolt 88 into engagement with the notch in the left-hand portion of bar 89.

Spring 94 also serves to actuate the bell crank 95 and cause the downwardly extending leg 95a to project into the passageway 23 and grip an additional coin placed into the apparatus while the check or coin, which is already in the apparatus, is being tested. This allows several coins to be placed in the apparatus at the same time and prevents the additional coins from moving into position before the feelers until the preceding coin has been tested. The rearward end of arm 86 which is integral with plate 26, has a pin 97 secured thereto which is adapted to be contacted at all times by a wire 98, said wire 98 extending downwardly and being adapted to block the upward movement of plate 79 when the proper thickness has not been measured by the set screw 27. When the upward movement of plate 79 is blocked by this wire the coin in the apparatus will be rejected.

Wire 98 is pivotally mounted on stud 99, which stud 99 is secured in projection 61. A torsion spring 100 is adapted to surround the stud 99 and has one end thereof normally engaging the wire 98 and its other end secured in projection 61 which causes the wire to normally assume the position shown in Figure 8 and engage the pin 97 at all times.

Figure 6:
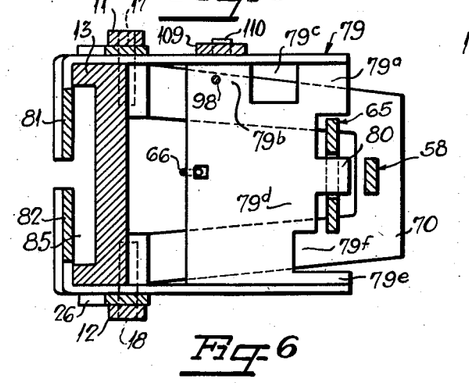
Figure 6 is a sectional plan view taken along the line 6—6 in Figure 3.

Let us assume that a coin which has a hole in the central portion thereof is inserted into slot 20 or 21 and is disposed between the set screw 27 and head portion 42 for measurement. It is evident that the end of set screw 27 would penetrate the hole thereby allowing the upper end of plate 26 and the arm 86 and its associated parts to move to the right, (Fig. 8) the maximum amount. When this is done the lower end of wire 98 will also be pushed to the right by pin 97, and when the extreme movement has taken place, the lower end of wire 98 will be resting directly above the portion 79a of plate 79, thereby preventing upward movement of plate 79 (Fig. 6). When lever 65 is pulled downwardly far enough to allow this defective coin to fall from between members 27 and 42 it will be rejected because the plate 79 will not be allowed to move upwardly to a position shown in Figure 12. When a coin which is too thick is inserted into the apparatus the lower end of wire 98 will stop directly above portions 79b of plate 79 (see Fig. 6), thereby blocking the upward movement of the deflector. Now when a genuine coin of the proper thickness is placed in the apparatus the pin 27 will be allowed to move inwardly just enough to cause the lower end of deflector wire 98 to move directly above the hole 79c in deflector plate 79. At this position, the plate 79 will be allowed to move upwardly to the position shown in Figure 12 because the lower end of wire 98 will pass through slot 79c.

It should be stated here that when the sliding plate 65 is caused to move downwardly by means of lever 77 or some similar apparatus, that the projections 65a which are integral with plate 65, will engage the V-shaped projection 90a on pivoted plate 90, (Figs. 8, 10 and 12), and cause the bar 89, under the tension of spring 93 to move bolt 88 and the upper portion of plate 26 to the right in Figure 8.

It should be noted that when plate 65 is pulled downwardly that the projections 65a contact projections 90a thereby causing plate 90 to pivot rearwardly. Since bar 89 is connected to plate 90 by spring 93, this bar will move rearwardly carrying with it bolt 88 and the upper portion of plate 26 which, in turn, will move set screw 27 against the face of coin 35. When the tip of set screw 27 contacts the coin spring 93 will be stretched and bar 89 will remain stationary while member 90 continues to move backwardly; therefore, it is seen that no undue pressure can be applied to the coin.

As the bar 65 is moved farther downwardly the projection 65b contacts the upper side of bar 89 and causes the left-hand end of bar to be disengaged from bolt 88 thereby relieving the pressure of the set screw 27 on the coin in the apparatus. When this is done, the plate 26 will again assume the position shown in Figure 8. Figure 12 shows the parts immediately before this projection causes bar 89 to become disengaged from bolt 88.

Figure 1:
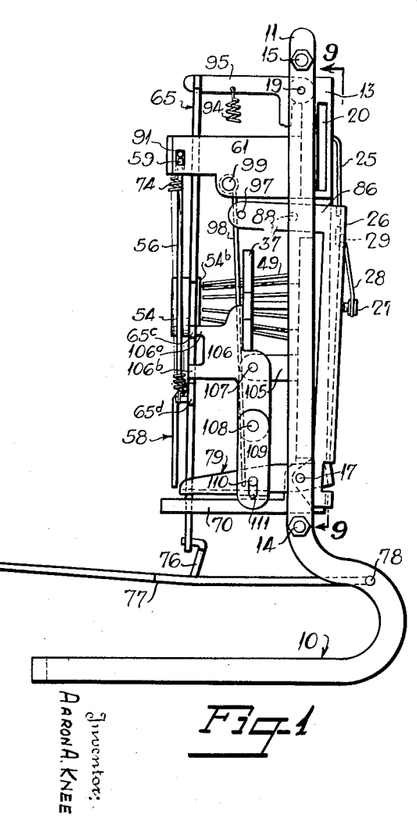
Figure 1 is an elevation of the left side of my apparatus mounted in a demonstration stand.

It is seen in Figures 1, 8 and 12 that framework 13 has a projection 105 extending laterally and rearwardly therefrom on which is pivotally mounted a dog 106 as at 107. In normal position this dog assumes the position shown in Figures 1 and 8, and the upper front portion thereof is adapted to rest against plate 37, whereas, the projections 106a and 196b are adapted to contact projections 65c and 65d on sliding plate 65. The lower leg of bell crank 106 is pivotally connected as at 108 to vertically disposed link 109, said link 109 having a slot 111 in the lower end thereof which is adapted to be penetrated by a pin 110 which is secured on plate 79. In the position shown in Figure 8, the plate 79 is being held downwardly by the pin 110, links 109 and the dog 106. This forms a toggle joint. In other words, when points 107, 108 and 110 are not in a straight line, the plate 79 is allowed to move upwardly under the tension of spring 66 (see Fig. 8), and assumes the position shown in Figure 12 when other parts such as member 58 or wire 98 do not block this movement.

Figure 10:
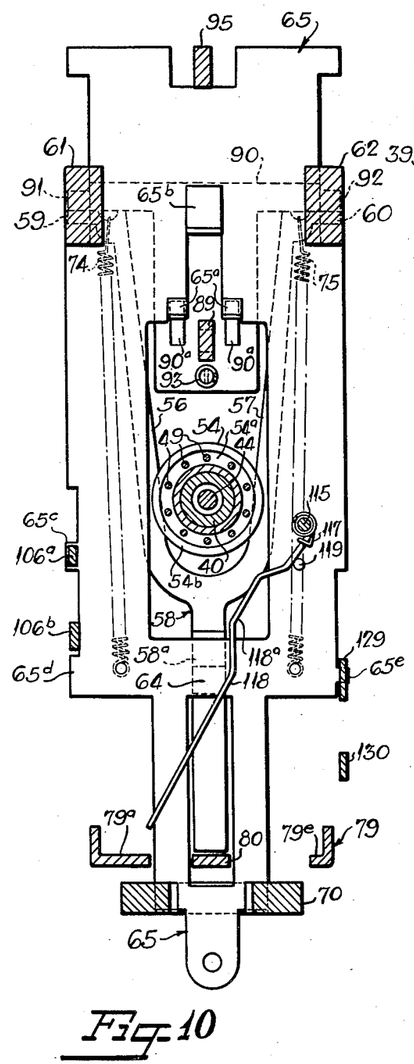
Figure 10 is a vertical sectional view taken along the line 10—10 in Figure 3.

It should be stated however, that the plate 79 and the members 106 and 109 remain in the position shown in Figure 1 until plate 65 is allowed to move downwardly far enough so that the projections 106b will be contacted by the projection 65c on plate 65, (Fig. 10). When this is done the pivot point 108 is caused to move towards the front of the apparatus thereby allowing the plate 79 to move upwardly if none of the deflectors or wires such as 98, which have been previously described, or the lower end of member 58, block upward movement of this plate. Should the movement of the plate 79 be blocked, the point 108 would be allowed to move toward the front in the same manner but would not actuate anything since the slot 111 is provided to allow such movement to take place, even if plate 79 does not move. After the pressure has been released from lever 77 and the sliding plate 65 is allowed to move upwardly again under the tension of springs 74 and 75 the projection 65d will contact the projection 106b and restore the parts 106 and 109 to normal position as shown in Figure 1.

Means for testing the surface configuration and means for testing the thickness of the coin have been described and now a third means for testing the diameter of the coin will be described.

Figure 13:
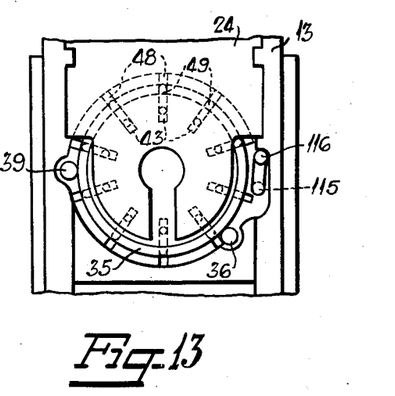
Figure 13 is a view similar to the central portion of Figure 9 showing a coin in position to be gauged as to thickness as well as for diameter.

By referring to Figures 5, 9, 10 and 13, it is seen that rod 115 is mounted for oscillation in framework 13 and plate 37. The front end of this rod is bent to form an L-shaped portion 116 which is adapted to contact the coin 35 in the manner as shown in Figure 13.

A torsion spring 117 has one end thereof secured in plate 37 and its other end contacting deflector wire 118 to move the deflector wire 118 in a counter-clockwise manner when the sliding plate is pulled downwardly, (Fig. 10).

When plate 65 is in normal or raised position, a suitable pin 119 restricts the counter-clockwise movement of the deflector wire 118 and causes it to assume the position as shown in Figure 10. It is evident that when the plate 65 is pulled downwardly that the off-set bent portion 118a in wire 118 will move against the pin 119 as shown in Figure 10, thereby allowing clockwise rotation of the shaft or rod 115 and causing the L-shaped portion 116 to press against the peripheral surface of the coin 35. Since the other portions of the coin are resting against the rods 36 and 39, the counter-clockwise rotation of L-shaped portion 116 will be stopped when it contacts the peripheral surface of the coin 35.

Let us assume that a coin slightly smaller in diameter than a genuine coin is inserted into the apparatus and upon the insertion of the coin the lever 65 is pulled downwardly to test the surface configuration, the thickness and the diameter of the coin. When this lever 65 is pulled downwardly the pin 119 will also move downwardly (Fig. 10), thereby allowing the torsion spring 117 to cause the rod 115 to rotate in a counter-clockwise manner which in turn will cause the L-shaped portion 116 to move until it contacts the periphery of the coin (Fig. 13). Since the coin is smaller than a genuine coin, the lower end of deflector 118 will be caused to move over directly above portion 79e of plate 79 (Fig. 6) thereby blocking the upward movement of the plate 79 and causing the portions 81 and 82 thereof to remain in the position shown in Figure 8, which will cause the coin to be rejected.

Should a coin of a larger diameter than that of a genuine one be inserted into the check testing apparatus the lower end of the deflector wire would not be moved enough to cause the coin to be accepted thereby causing the lower end to rest directly above portions 79d of plate 79 and blocking the upward movement of plate 79. Therefore, the coin will be rejected in the same manner as in the case where the coin was too small in diameter.

When a genuine coin of the proper diameter is inserted, the movement of the L-shaped portion 116 will be just sufficient to cause the rotation of shaft 115 to move the lower end of deflector wire 118 directly over slot 79f in plate 79. With the lower end in this position, the deflector plate may move upwardly while the lower end of the wire is in this position thereby causing the portions 81 and 82 to move forwardly to allow the coin to fall down through channelway 85 into the apparatus. The testing as to thickness, surface configuration and diameter takes place simultaneously and a defective coin in any of these respects will be rejected.

Figure 3:
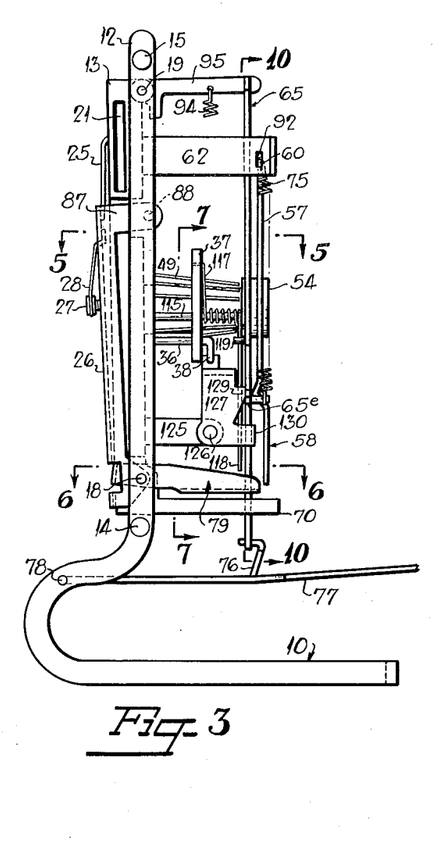
Figure 3 is a right side elevation looking at the right-hand side of Figure 2.
Figure 4:
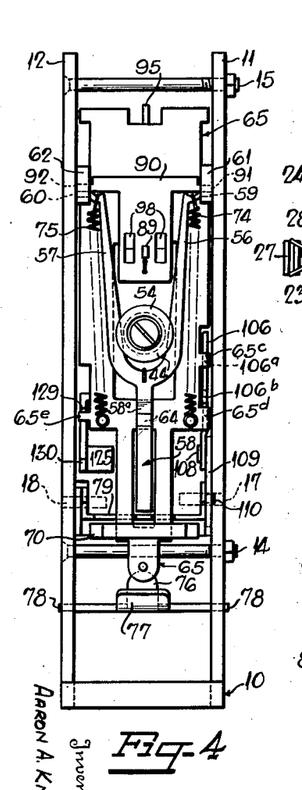
Figure 4 is a rear elevation looking at the right-hand side of Figure 3.

The framework 13 has projecting therefrom (see Figs. 3 and 7), a portion 125 to which is pivoted as at 126 a member 127. Member 127 has a laterally projecting portion 128 which has a forked end engaging the member 38. Member 127 also has beveled projections 129 and a rectangular portion 130 (Figs. 3 and 10). When the coin has been tested and it is desired to release it to either be rejected or to fall into the machine, the projection 65e on plate 65 contacts the projection 130 and causes the member 127 to rotate a slight amount in a clockwise direction, (Fig. 3).

Since the forked end of member 128 is engaging the portion 38 it is evident that this rotation will cause the ends of members 36 and 39 which project through the front portion of the framework 13 to be moved rearwardly in the machine until they do not furnish an obstruction to the coin, thereby allowing the coin to fall, (Fig. 5). When the plate 65 is released and allowed to be pulled upwardly into normal position again, the beveled surface 129 will be contacted by the projection 65e to restore the parts to their original position where another coin can be inserted and tested.

Figure 14:
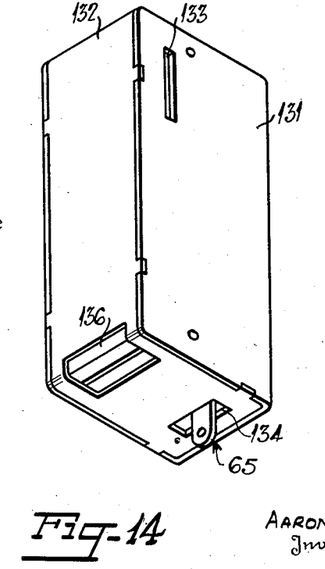
Figure 14 is an isometric view showing the apparatus mounted in a suitable casing instead of being mounted in a demonstration stand, as shown in Figures 1 to 4 inclusive.

In Figure 14 the apparatus is shown enclosed in a cover which is merely another form of enclosing the apparatus. This cover comprises two pieces, namely, a U-shaped portion 131 and another U-shaped portion 132 fitting tightly to member 131. Suitable slots 133 are provided for the insertion of the coin and near the lower portion of member 132 a slot 134 is cut in order to allow the lower end of the sliding plate 65 to project therethrough. The means for operating the apparatus in this case is not shown, but it is evident that it may be operated in one of many conventional ways by having means for applying a downward pull to member 65. Another slot 136 is provided to allow the coin to be expelled from the casing into the machine, not shown, after it has been tested.

In many States of the Union there is a law existing which prohibits the use of any check which is of the same diameter as a genuine coin. In these States, should it be desired to use a check testing apparatus, on a game board or in fact, on any apparatus where it is desired to use slugs of a larger diameter instead of the genuine coin, it would be impossible to use this device shown in Figures 1 to 13 of the drawings, because the check would be rejected due to the fact that it was slightly larger in diameter than a genuine coin; therefore, I have provided means for causing the slug or coin to be tested in regard to thickness, surface configuration as well as to diameter, and have provided means so that when the diameter of a coin is of a certain over-size it will be accepted, and also whereby genuine coins will be accepted. If the coin is of a smaller diameter than a genuine coin, it will be rejected as any other slug, therefore, means have been provided so that this apparatus may be used in connection with game boards or slot machines where it is desired to sell over-sized slugs to the customers and allow the customers to use the same slugs in the machine without violating any of the laws of the States which prohibit the use of a slug of the same diameter as a genuine coin.

Figures 15, 16:
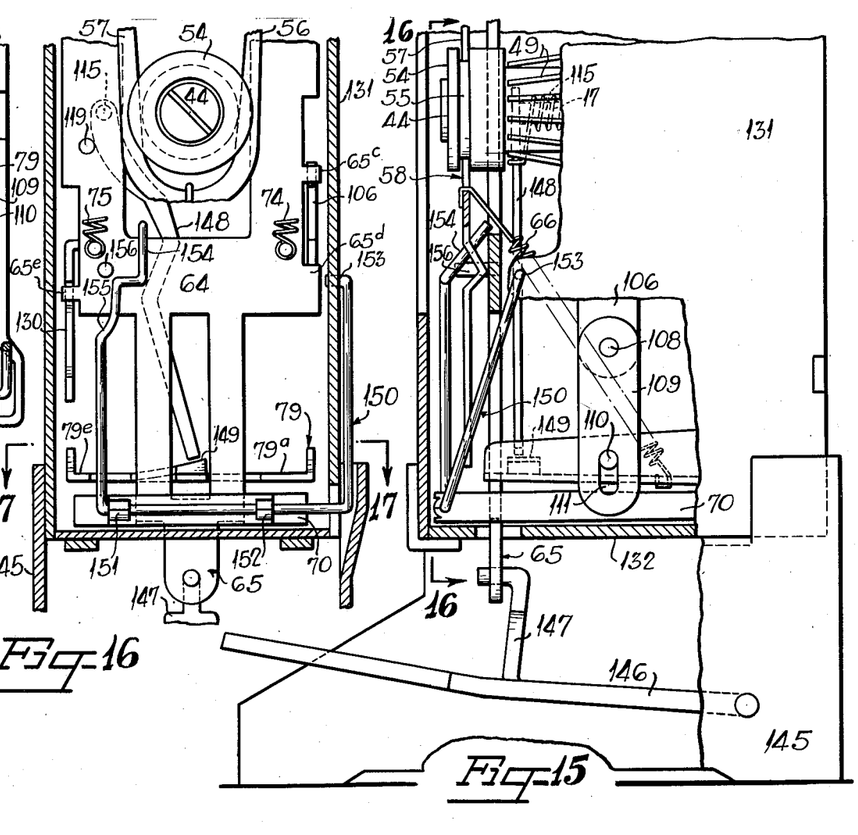
Figure 15 is an elevation of the lower portion of the check testing apparatus showing means for allowing a coin, which is slightly larger in diameter than the genuine coin but conforming in every other respect to a genuine coin, to be accepted.
Figure 16 is a sectional elevation taken along the line 16—16 in Figure 15.

Figure 15 shows the casing 131 with its associated parts which is mounted in a suitable base or supporting stand 145. Pivotally mounted in this stand is a lever 146 having an L-shaped projection 147 which normally engages the lower end of slide 65 for the operation of the check testing apparatus. As has been previously stated in the foregoing specification, when a coin is of the proper diameter, the L-shaped portion 116 (Fig. 9) of rod 115, is rotated and engages the peripheral surface of the coin or check, and when this coin or check is of the proper diameter the L-shaped portion will be rotated by rod 115, which, in turn, will cause the deflector wire 118 in Figure 10, to rotate in a counter-clockwise manner until it is disposed directly over the notch 79f in Figure 6. If all of the other portions of the coin measure correctly, then the deflector plate 79 will be allowed to move upwardly because the lower end of deflector wire 118 will not block the upward movement of the same, therefore, the coin will be accepted since the upwardly projecting portions 81 and 82 will pivot outwardly and allow the coin to fall downwardly through passageway 85.

Instead of using a deflector wire 118, I have provided a flattened plate member 148 which is mounted in the same manner as wire 118 and is normally operated by spring 117, said spring normally holding the member 148 in the position shown in Figure 16. In the position shown in said Figure 16, it is evident that deflector plate 79 could not move outwardly since it would be blocked by the arcuate surface 149 which is formed on the top of the deflector plate. Should a coin or check, which is of a smaller diameter than a genuine coin, be inserted into the machine, the rod 115 would be allowed to rotate until the lower end of the member 148 would be disposed above surface 79e, thereby preventing the member 79 from pivoting upwardly and therefore, causing the coin to be rejected. Normally, when a coin or check is of too large a diameter, the rod 115 would not be allowed to rotate enough to cause the lower end of member 148 to move off of the arcuate surface 149 and the upward movement of member 79 about the pivot points 17 and 18 would not be allowed to take place. It is only when the diameter is such that the rotative movement of rod 115 is sufficient to cause the lower end of member 148 to be disposed directly over the slot 79f that the coin will be accepted.

As has been previously stated, when the lower end of member 148 is disposed over this opening, no obstruction is offered to the upward movement of member 79 when the slide 65 is pulled downwardly by lever 146 to test the coin.

It is, therefore, evident that if it is desired that a coin or check, which is genuine in every respect, except as to diameter, and that diameter is slightly over-size, is to be accepted in this apparatus, means must be provided whereby, when the check is tested, the deflector 148 must be moved in a counter-clockwise manner about rod 115 (Fig. 16), until the lower end thereof is disposed in the position so that it will offer no obstruction to the upward movement of the member 79.

I have provided a U-shaped wire member 150 which is pivotally mounted as at 151 and 152 in the rear edge of projection 70. One end of member 150 normally engages a hole in the side of housing 131 as at 153, and its other end has a bent over portion 154 normally resting against the upper side of portion of slide 65. By anchoring the member 150 in this manner, it acts as a spring and when the slide 65 is pulled downwardly the bent over portion 154 will move inwardly as the slide 65 progresses downwardly. The member 150 has a beveled surface 155 which is engaged by pin 156 fixed in plate or slide 65, as the slide is moved downwardly.

When a check has a larger diameter than that of a genuine coin or check the lower end of member 148 will remain in the position shown in Figure 16 thereby preventing any upward movement of the member 79 when the member 150 is absent. By providing this U-shaped member 150 it is evident that when a coin of an oversized diameter is placed in the apparatus and pressure is applied to the free end of lever 146 to cause the slide 65 to move downwardly that the inclined portion 154 of the wire 150 will move slightly to the right (Fig. 15), until it is disposed directly in front of the path of travel of the member 148.

Upon further downward movement of slide 65 the pin 156 will engage the beveled surface 155 and move the upper end or the inclined portion 154 to the right (Fig. 16), thereby rotating the member 148 in a counter-clockwise manner about rod 115 to cause the lower end of said member 148 to be disposed over the opening 157 (Fig. 17), instead of the arcuate surface 149. With the lower end of member 148 in this position, the member 79 will not be prevented from moving upwardly due to this member, and if the coin or check is genuine in every respect, it will be accepted.

Should it be desired to use coins instead of slugs it is only necessary to pull the end of the U-shaped member out from engagement with the housing 131 which will allow the U-shaped member to be moved backwardly to a position where it will not engage the slide 65.

It is, therefore, seen that means have been provided whereby this apparatus may be adapted for use where coins or special slugs of a slightly larger diameter than that of a genuine coin may be used provided that the surface configurations and the thickness are of the proper dimensions.

Figure 17:
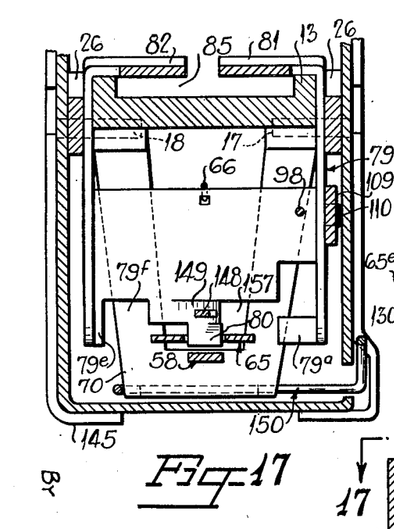
Figure 17 is a sectional plan view taken along the line 17—17 in Figure 16.
Figures 18, 19:
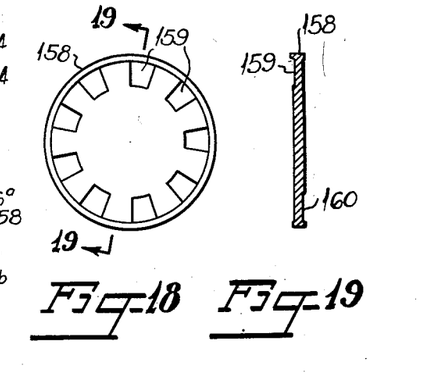
Figure 18 is an elevation of a special slug or coin which is slightly larger in diameter than a genuine coin and which is adapted to be used in connection with the structure shown in Figures 15, 16 and 17.
Figure 19 is a sectional view taken along the line 19—19 in Figure 18.

Figures 18 and 19 show a check which is slightly over-size in diameter and which may be used and accepted in the form of the invention shown in Figures 15, 16 and 17. This check 15f has nine cavities or indentations 159 on one face and in staggered relation thereto are nine indentations 160 on the other side thereof. By providing a check of this description, it is impossible for all of the feelers to be moved exactly the same amount because there are ten feelers 49 and some of these feelers will have to engage a depression while others will engage the high portions of the slug. This is very essential, as it has been previously pointed out, that should all of the feelers be operated exactly the same amount, the coin would be rejected, regardless of whether the thickness was correct or not. In other words, the perfectly smooth coin or check which has even surfaces would not be accepted, even if it was of proper thickness and the proper diameter. If desired, an odd number of feelers may be provided and an even number of depressions may be provided in the check. The only requirement is, that both feelers and depressions be not of an odd or even number.

The ordinary coin has high and low places in the surface thereof and these variations are of such extent that when a coin is pressed against the feelers, the high places on the face of the coin will move some of the feelers past the annular portion 54b, while the low places which are engaged by one or more of the feelers will move these feelers far enough to engage the annular portion 54b.

A check which is smooth on its surface will move all of the feelers so their rear ends will pass outwardly too far to engage portion 54b, while if the smooth check has a relatively deep groove therein, the feeler or feelers which coincide with this groove will not be moved at all and therefore, the portion 54b will not be engaged by any of the feelers and the check will be rejected for this reason.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. In a check testing apparatus, means for testing the surface configuration of an inserted check, means for testing the diameter of the check, means for applying pressure to the check to press it against the surface configuration testing means, means for testing the thickness of the check, means controlled independently by each of said means for disposing of said check, and means settable at will and movable by the pressure applying means into the path of the diameter measuring means for holding the same in a position to cause the check to pass the test imparted thereto by the diameter measuring means even though it is of a predetermined oversize.

2. In a check testing apparatus for testing a circular check having a plurality of equally spaced depressions therein, arranged in a circle whose center is the center of the check, a plurality of feelers arranged in a circle coinciding with the circle defined by said depressions for engaging the surface of a check when the check is pressed against the feelers, the feelers and the depressions being unlike in number, and means controlled independently by the feelers for disposing of said check after it has been pressed against said feelers.

3. In a check testing apparatus, a movable deflector for directing the checks after they have been tested, a plurality of feelers, means for pressing a check against one end of the feelers, a prescribed check having undulations in the surface thereof whereby the other end of all of the feelers will be moved to some extent and others of said feelers will be moved to a greater extent, an annular member, means for moving the annular member towards one end of said feelers, means carried by said annular member for controlling said deflector and adapted to be engaged by the feelers moved a lesser extent to permit movement of the deflector.

4. In a check testing apparatus having a plurality of feelers against one end of which a check is adapted to be pressed for testing, a movable deflector for disposing of said check after it has been engaged by the feelers, means for moving the deflector, a movable member having an annular portion and controlling the deflector, a prescribed check having variations in surface configuration so that the high places on the check will move the other ends of the feelers engaging the same a greater amount than the feelers engaging the low places, the feelers engaging the low places in the check being positioned in the path of the annular portion to allow movement of the deflector to accept the check, and whereby a smooth check having a groove therein will move the other ends of said feelers either outside or inside the annular portion to thereby fail to allow movement of the deflector and to reject the check.

5. In a check testing apparatus, a movable deflector for directing tested checks into or out of the apparatus, a pivoted member having means for holding one end normally in position to block movement of the deflector and having its other end engageable by the edge of an inserted check to position the said one end in a non-blocking position if the check is of the proper size, means for applying pressure to an inserted check, another movable member having one end in normal blocking position with relation to the deflector and movable to non-blocking position by the pressure applying means if the check is of the proper thickness, and means for engaging the first testing means and moving the same to non-blocking position when a check is of a prescribed oversize.

6. In a check testing apparatus, a plurality of feelers for engaging the side of a check, a pivoted member for exerting pressure on the check, a vertically movable member, a second pivoted member movable by the first pivoted member, a third pivoted member mounted on the second pivoted member and having a hook for engaging the first pivoted member, tension means for normally pressing the hook into contact with the first pivoted member, a cam surface on the vertically movable member for engaging the second pivoted member for imparting movement to the third pivoted member to move the first pivoted member to apply pressure to the check, and means on the vertically movable member for engaging the third pivoted member to move it out of engagement with the first pivoted member after pressure has been applied to the check, and means controlled by the feelers when moved by pressure on the check for disposing of said check.

7. In a check testing apparatus, means for testing the check as to its surface configurations, means for testing the diameter of the check, means for testing the thickness of the check, a movable deflector for disposing of the check as it leaves the apparatus, tension means normally moving the deflector to one position, a toggle-joint mechanism for resisting the movement, means for moving the toggle-joint mechanism to non-resisting position after all of the testing operations have been completed, the several testing means normally blocking movement of the deflector but permitting movement thereof after the toggle-joint mechanism has been moved if the check has proper size, thickness and surface configurations.

8. In a check testing apparatus, a plurality of feelers for engaging the face of an inserted check, means for forcing said check against said feelers, a deflector, means tending to move the deflector into one position to accept the check, an annular member and means tending to move the annular member, the end of the feelers remote from the face of the check normally occupying a position inside the annulus defined by said annular member and being movable independently in varying degrees by the pressure applied to the check on account of variations in surface configurations of the check so that a check having variations on its surface configuration will move the remote end of some of the feelers into the path of the annular member, and means controlled by the unmoved annular member for allowing the deflector to move to accept the check as genuine.

9. In a check testing apparatus, the combination of a plurality of equally spaced independently movable feelers arranged in a circle against which is adapted to be pressed a check having a plurality of equally spaced depressions therein also arranged in a circle of the same diameter as the circle in which the feelers are arranged, the distance between the depressions being different from the distance between the feelers so that when the check is pressed against the feelers all of the depressions will not coincide with all of the feelers and the feelers will be moved in different degrees, and means controlled by the feelers for accepting said check if it has equally spaced depressions therein and to reject the check if it does not have said equally spaced depressions therein.

10. Check testing apparatus comprising means for testing a check as to diameter, means for testing the surface configurations of the check, means for pressing said check against the surface testing means, means for disposing of said check comprising a movable deflector, means for moving the deflector, a swinging member for engaging the periphery of the check for normally blocking movement of the deflector to reject the check when it is oversized, other means movable into the path of the swinging member by the means for pressing the check against the surface testing means, when the check is of a predetermined oversize to arrest the movement of the swinging member so it will not block movement of the deflector to thereby accept the check having a predetermined oversize.

11. Check testing apparatus for accepting checks of a given size comprising movable diameter measuring directing means for measuring the check as to diameter, means controlled by the diameter measuring means for disposing of said check as it is passed through the apparatus, means for moving the directing means, means for also accepting a check of predetermined oversize comprising a movable member having an inherent resiliency for moving it in front of the movable diameter measuring means for arresting the movement of the diameter measuring means in a position to allow movement of the directing means to a position to accept the check.

12. Check testing apparatus for accepting checks of a given size and also for accepting checks of a predetermined oversize, comprising a manually movable slide, movable means for engaging the periphery of the check, a deflector for disposing of said check and controlled by said movable means, means for moving the deflector, other means movable by the slide into the path of the first movable means if the check is of a predetermined oversize to hold the first movable means away from the second movable means until said second movable means has moved into the path of the first movable means to arrest travel of the first movable means in a position to allow movement of the deflector and means for disconnecting said other movable means from said slide whereby an oversized check will be rejected.

13. In a check testing apparatus for testing a circular check having a plurality of equally spaced depressions therein arranged in a circle whose center is the center of the check, a plurality of equally spaced feelers arranged in a circle coinciding with the circle defined by said depressions for engaging the surface of a check when the check is pressed against the feelers, the feelers and depressions being unlike in number, and means controlled independently by the feelers for accepting said check after it has been pressed against said feelers and for rejecting a check if it does not have said equally spaced depressions therein.

14. In combination, a check having a plurality of evenly spaced depressions arranged concentrically of the check, apparatus for testing checks comprising a plurality of independently movable feelers also arranged in a circle which is concentric with the circle defined by said depressions, the number of feelers being different from the number of depressions in said check, means for engaging the check and applying lateral pressure thereto to press the check against said feelers, a movable deflector for disposing of said checks, and means controlled independently by each of the feelers when pressure is applied to said check for controlling the position occupied by the deflector to thereby accept said check, and to reject a check which may be placed in the apparatus if it does not have said equally spaced depressions therein.

15. In a check testing apparatus, a plurality of independently movable feelers for engaging the side of an inserted check, means for applying pressure to one side of the check to press it against said feelers, a deflector for disposing of said check and controlled independently by each of said feelers for disposing of said check, said feelers being arranged in a circle so that when a check having a number of equally spaced depressions therein also arranged in a circle coinciding with the circle defined by the feelers, but differing in number from the number of feelers, is deposited in said apparatus and pressure is applied thereto the check will be accepted but if the number of depressions and feelers is the same the check will be rejected.

AARON A. KNEE.